US011039334B2

(12) United States Patent
Han et al.

(10) Patent No.: US 11,039,334 B2
(45) Date of Patent: *Jun. 15, 2021

(54) TRANSMISSION OF PHYSICAL BROADCAST CHANNEL (PBCH) CONTENTS

(71) Applicant: Apple Inc., Cupertino, CA (US)

(72) Inventors: Seunghee Han, Cupertino, CA (US); Gang Xiong, Beaverton, OR (US); Alexey Khoryaev, Nizhny Novgorod (RU)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/153,584

(22) Filed: Oct. 5, 2018

(65) Prior Publication Data

US 2019/0053093 A1 Feb. 14, 2019

Related U.S. Application Data

(63) Continuation of application No. 15/202,264, filed on Jul. 5, 2016, now Pat. No. 10,123,231, which is a (Continued)

(51) Int. Cl.
H04W 28/02 (2009.01)
G01S 5/02 (2010.01)
(Continued)

(52) U.S. Cl.
CPC ....... H04W 28/0242 (2013.01); G01S 5/0236 (2013.01); H04B 7/2643 (2013.01);
(Continued)

(58) Field of Classification Search
CPC .......... H04W 4/00; H04W 4/14; H04W 4/70; H04W 24/10; H04W 28/02;
(Continued)

(56) References Cited

U.S. PATENT DOCUMENTS 8,265,031 B2 9/2012 Tanno et al.
8,351,392 B2 1/2013 Ahn et al.
(Continued)

FOREIGN PATENT DOCUMENTS

WO WO 2010082775 A2 7/2010

OTHER PUBLICATIONS

CATT; "PBCH Coverage Improvement for Low-Cost MTC Use;" 3GPP TSG R1-130982; (Apr. 2013); 4 pages, RAN WG1 Meeting 72bis, Chicago, USA; Agenda 7.2.4.2.

(Continued)

Primary Examiner — Tri H Phan
(74) Attorney, Agent, or Firm — Fish & Richardson P.C.

(57) ABSTRACT

Technology for transmitting physical broadcast channel (PBCH) contents is disclosed. An evolved node B (eNB) may configure one or more repetitions of PBCH content for transmission, to a user equipment (UE), from a cell at a selected time interval. The eNB may select a scrambling code for the one or more repetitions of PBCH content transmitted from the cell. The eNB may apply the scrambling code to one or more repetitions of PBCH content.

17 Claims, 10 Drawing Sheets

Related U.S. Application Data continuation of application No. 14/316,180, filed on Jun. 26, 2014, now Pat. No. 9,386,476.

(60) Provisional application No. 61/879,014, filed on Sep. 17, 2013.

(51) Int. Cl.

| | | |
|---|---|---|
| *H04B 7/26* | (2006.01) | |
| *H04J 13/00* | (2011.01) | |
| *H04J 3/02* | (2006.01) | |
| *H04L 1/18* | (2006.01) | |
| *H04L 27/26* | (2006.01) | |
| *H04L 5/00* | (2006.01) | |
| *H04L 5/14* | (2006.01) | |
| *H04W 24/10* | (2009.01) | |
| *H04W 36/00* | (2009.01) | |
| *H04W 36/04* | (2009.01) | |
| *H04W 4/14* | (2009.01) | |
| *H04W 4/70* | (2018.01) | |
| *H04W 64/00* | (2009.01) | |
| *H04W 72/04* | (2009.01) | |
| *H04W 76/28* | (2018.01) | |
| *H04W 28/12* | (2009.01) | |

(52) U.S. Cl.
CPC ............ *H04J 3/02* (2013.01); *H04J 13/0048* (2013.01); *H04L 1/1893* (2013.01); *H04L 5/003* (2013.01); *H04L 5/0048* (2013.01); *H04L 5/0051* (2013.01); *H04L 5/14* (2013.01); *H04L 27/2601* (2013.01); *H04W 4/14* (2013.01); *H04W 4/70* (2018.02); *H04W 24/10* (2013.01); *H04W 28/0236* (2013.01); *H04W 28/0247* (2013.01); *H04W 28/0268* (2013.01); *H04W 36/04* (2013.01); *H04W 64/00* (2013.01); *H04W 72/042* (2013.01); *H04W 72/0446* (2013.01); *H04W 72/0466* (2013.01); *H04W 76/28* (2018.02); *H04W 28/12* (2013.01)

(58) Field of Classification Search
CPC ......... H04W 28/0236; H04W 28/0242; H04W 28/0247; H04W 28/0268; H04W 28/12; H04W 36/00; H04W 36/0083; H04W 36/04; H04W 64/00; H04W 72/04; H04W 72/042; H04W 72/0446; H04W 76/28; H04L 1/18; H04L 1/1893; H04L 5/00; H04L 5/003; H04L 5/0048; H04L 5/0051; H04L 5/14; H04L 27/26; H04L 27/2601; H04B 7/26; H04B 7/2643; H04J 3/02; H04J 13/00; H04J 13/0048; G01S 5/02; G01S 5/0236

See application file for complete search history.

(56) References Cited

U.S. PATENT DOCUMENTS

| | | | | |
|---|---|---|---|---|
| 8,446,868 B2* | 5/2013 | Seong | ................... | H04L 1/0052 370/329 |
| 8,509,110 B2 | 8/2013 | Kim et al. | | |
| 8,520,601 B2* | 8/2013 | Ko | ....................... | H04B 7/0654 370/328 |
| 8,570,971 B2 | 10/2013 | Bhattad et al. | | |
| 8,964,676 B2* | 2/2015 | Ji | ............................ | H04B 7/04 370/329 |
| 8,982,759 B2 | 3/2015 | Kim et al. | | |
| 9,008,585 B2* | 4/2015 | Xiao | ..................... | H04L 1/0027 455/67.11 |
| 9,042,240 B2* | 5/2015 | Luo | ....................... | H04L 1/0038 370/252 |
| 9,338,763 B2* | 5/2016 | Seong | ................... | H04L 1/0025 |
| 9,374,151 B2* | 6/2016 | Xiong | .................... | H04W 4/70 |
| 9,386,476 B2* | 7/2016 | Han | ........................ | H04W 4/70 |
| 9,516,659 B2* | 12/2016 | Han | ...................... | H04W 76/14 |
| 9,900,876 B2* | 2/2018 | Gao | ......................... | H04L 1/08 |
| 9,913,268 B2* | 3/2018 | Yang | .................. | H04W 72/042 |
| 9,924,376 B2* | 3/2018 | Yi | ......................... | H04W 84/047 |
| 9,980,254 B2* | 5/2018 | Shi | .................... | H04W 72/0446 |
| 10,009,882 B2* | 6/2018 | You | ........................ | H04L 5/0053 |
| 10,123,231 B2* | 11/2018 | Han | ........................ | H04W 4/70 |
| 2010/0272004 A1 | 10/2010 | Maeda et al. | | |
| 2011/0274102 A1 | 11/2011 | Kim et al. | | |
| 2013/0121249 A1 | 5/2013 | Ji et al. | | |
| 2013/0136098 A1* | 5/2013 | Li | ....................... | H04W 72/042 370/330 |
| 2013/0250878 A1 | 9/2013 | Sayana et al. | | |
| 2013/0294353 A1 | 11/2013 | Han et al. | | |
| 2014/0071957 A1 | 3/2014 | Xu et al. | | |
| 2014/0098761 A1 | 4/2014 | Lee et al. | | |
| 2014/0185578 A1 | 7/2014 | Park et al. | | |
| 2014/0301305 A1 | 10/2014 | Xu et al. | | |
| 2014/0301353 A1 | 10/2014 | Frenne et al. | | |
| 2014/0348063 A1 | 11/2014 | Kang et al. | | |
| 2014/0348077 A1 | 11/2014 | Chen et al. | | |
| 2015/0078348 A1 | 3/2015 | Han et al. | | |
| 2015/0180629 A1 | 6/2015 | Lorca Hernando | | |
| 2015/0245323 A1 | 8/2015 | You et al. | | |
| 2015/0296518 A1 | 10/2015 | Yi et al. | | |
| 2015/0304994 A1 | 10/2015 | Kim | | |
| 2015/0326995 A1 | 11/2015 | Li et al. | | |
| 2016/0183231 A1 | 6/2016 | Shi et al. | | |
| 2016/0315739 A1 | 10/2016 | Han et al. | | |
| 2016/0353420 A1 | 12/2016 | You et al. | | |

OTHER PUBLICATIONS

Huawei et al.; "Further Discussion on PBCH Coverage Improvement for Low-Cost MTC;" 3GPP TSG R1-132880; (Aug. 2013); 4 pages; RAN WG1 Meeting 74, Barcelona, Spain; Agenda 7.2.4.2.
3GPP TR 36.888; "Study on Provision of Low-Cost Machine-Type Communications (MTC) User Equipments (UEs) Based on LTE;" (Jun. 2013); 55 pages; V 12.0.0, Release 12.
3GPP TS 36.211; "Evolved Universal Terrestrial Radio Access (E-UTRA); Physical Channels and Modulation;" (Jun. 2013); 108 pages; V 11.3.0, Release 11.
Alcatel-Lucent et al.; "Coverage Enhancement for PBCH;" 3GPP TSG R1-132972; (Aug. 2013); 3 pages; RAN WG1 Meeting 74, Barcelona, Spain; Agenda 7.2.4.2.
ITRI; "PBCH Coverage Extension for MTC Devices;" 3GPP TSG R1-132256; (May 2013); 3 pages; RAN WG1 Meeting 73, Fukuoka, Japan; Agenda 6.2.4.
PCT International Preliminary Report on Patentability in International Appln. No. PCT/US2014/055751, dated Mar. 22, 2016, 7 pages.
PCT International Search Report and Written Opinion in International Appln. No. PCT/US2014/055751, dated Dec. 17, 2014, 10 pages.
EP Extended European Search Report and Written Opinion in European Appln. 14846425.8, dated Aug. 14, 2017, 10 pages.
EP Supplementary Partial European Search Report and Written Opinion in European Appln. 14846425.8, dated May, 11, 2017, 12 pages.

* cited by examiner

TRANSMISSION OF PHYSICAL BROADCAST CHANNEL (PBCH) CONTENTS

RELATED APPLICATIONS

The present application is a continuation of U.S. patent application Ser. No. 15/202,264 filed Jul. 5, 2016, which is a continuation of U.S. patent application Ser. No. 14/316,180 filed Jun. 26, 2014 which claims the benefit of U.S. Provisional Patent Application No. 61/879,014, filed Sep. 17, 2013, the entire specifications of which are hereby incorporated by reference in their entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE Release 8, 9, 10 or 11 systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
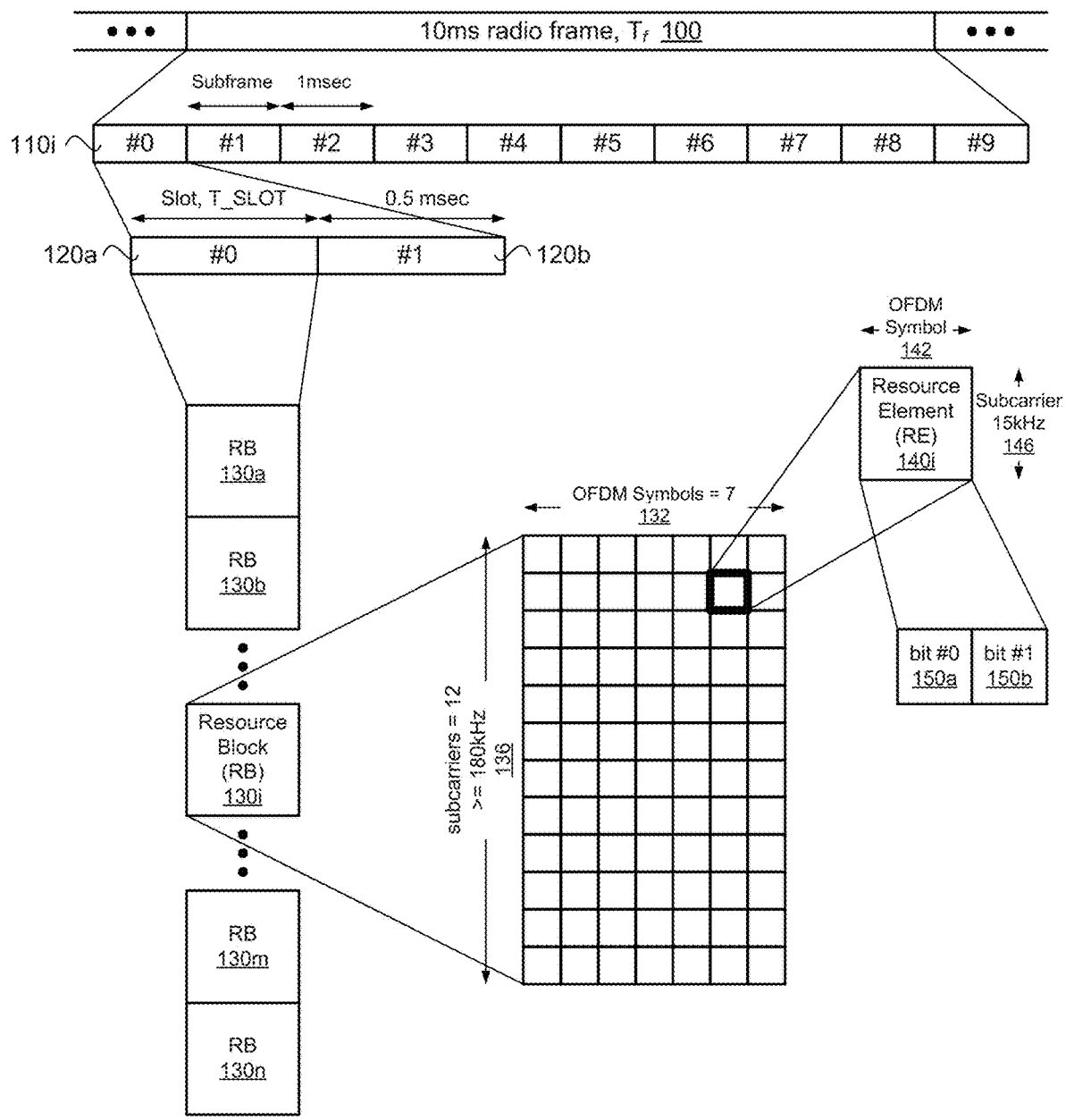
FIG. 1 illustrates a block diagram of an orthogonal frequency division multiple access (OFDMA) frame structure in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Technology is described for enhancing coverage of user equipments (UEs) equipped to support machine type communication (MTC). A plurality of evolved node Bs (eNBs) can transmit repetitions of physical broadcast channel (PBCH) content from one or more cells to the UE, but these repetitions of PBCH content may not assure robust PBCH decoding performance at the UE due to constant cross-correlation among the cells. Therefore, interference randomization can be applied to the repetitions of PBCH content in order to enhance coverage and provide for robust decoding of PBCH content at the UE. In one example, a scrambling code can be applied to the repetitions of PBCH content in order to provide the interference randomization. In an alternative configuration, the repetitions of PBCH content may be transmitted at different time locations for a plurality of cells, thereby enhancing coverage at the UE.

FIG. 1 illustrates a downlink radio frame structure type 2, as discussed in Release 11 of the 3GPP LTE standard. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. Each slot for a component carrier (CC) used by the transmitting station and the receiving station can include multiple resource blocks (RBs) 130a, 130b, 130i, 130m, and 130n based on the CC frequency bandwidth. The CC can have a carrier frequency having a bandwidth and center frequency. Each RB (physical RB or PRB) 130i can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used.

The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 2:
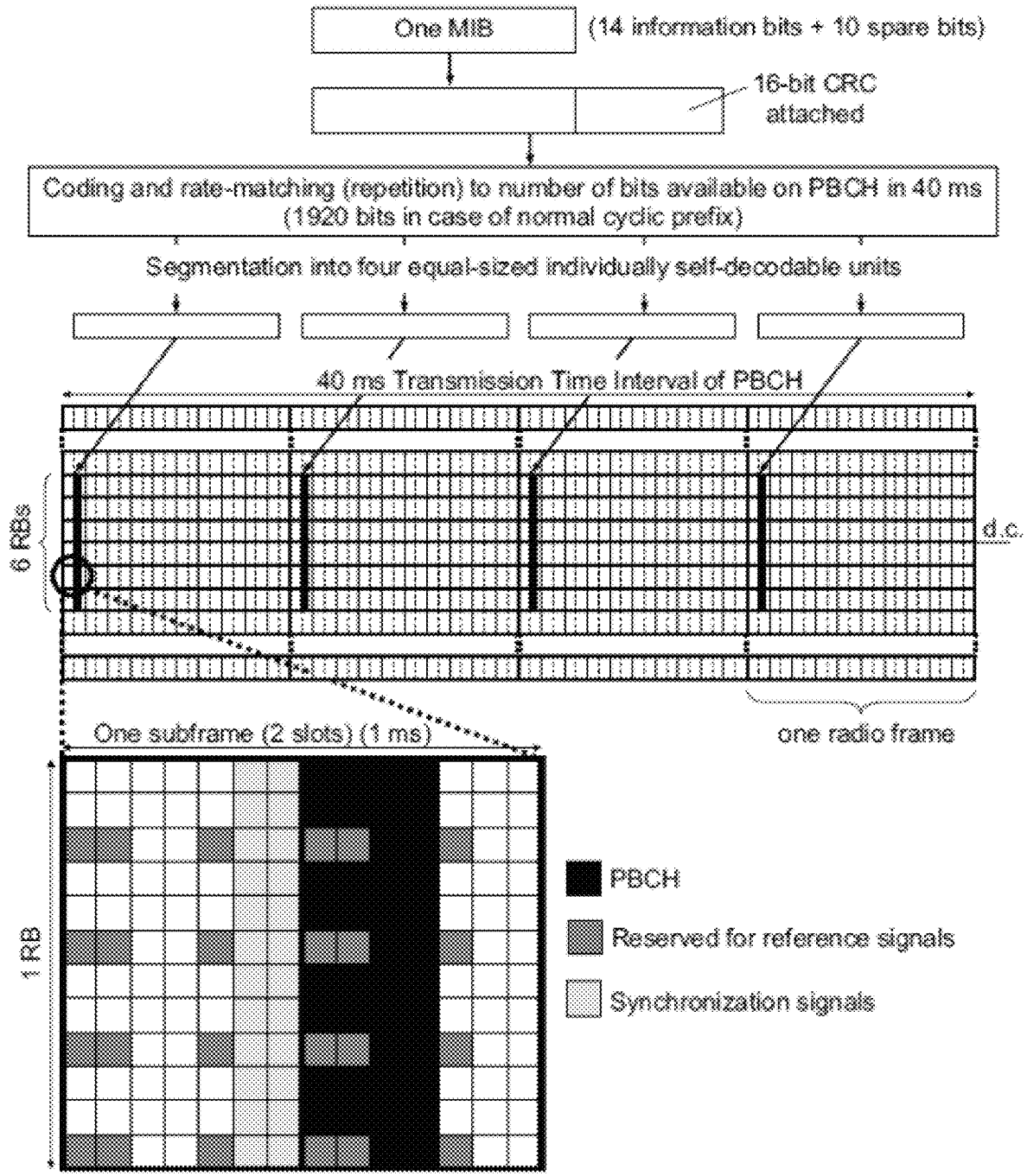
FIG. 2 illustrates a physical broadcast channel (PBCH) structure in accordance with an example.

FIG. 2 illustrates a physical broadcast channel (PBCH) structure. A master information block (MIB) can include a limited number of frequently transmitted parameters that are useful for initial access to a cell. The MIB can be carried on the PBCH. The MIB can include 14 information bits and 10 spare bits, for a total of 24 bits. The 24 bits in the MIB can be attached to a 16-bit cyclic redundancy check (CRC). A Tail Biting Convolutional Code (TBCC) can be applied to the CRC-attached information bits and then rate-matching with the encoded bits can be performed. The rate matching can produce 1920 encoded bits and 1728 encoded bits for normal and extended cyclic-prefix (CP), respectively, in order to be mapped across 40 ms.

The rate-matching operation can be regarded as a repetition of the encoded bits by a 1/3 mother coding rate. Therefore, 120 (i.e., 40×3) encoded bits are repeated to fill out the available REs for the PBCH. The same 480 encoded bits are repeated with the same phases at every 10 ms for 40 ms in normal CP due to the 1/3 mother coding rate, while the different 432 encoded bits are repeated with the different phases at every 10 ms for 40 ms in extended CP. The cell-specific scrambling code on top of the encoded bits is applied, not only to detect one of four radio frames (2-bit LSB of SFN), but also to provide the interference randomization among the cells. The cell-specific scrambling code is re-initialized at every 40 ms, and thus can provide the function to distinguish 2-bit LSB (Least Significant Bit) of SFN, which is the 10 ms (one radio frame) boundary detection among 40 ms (4 radio frames), by means of the different phases of cell-specific scrambling sequences. A UE can require four blind decoding attempts to find out the 2-bit LSB of SFN, while 8-bit MSB (Most Significant Bit) of SFN is explicitly signaled by the PBCH contents.

The scrambling code that is traditionally used is further described in 3GPP Technical Specification (TS) 36.211 Section 6.6.1, Release 11. The block of bits b(0), . . . , b($M_{bit}$−1), where $M_{bit}$, the number of bits transmitted on the physical broadcast channel, equals 1920 for normal cyclic prefix and 1728 for extended cyclic prefix, can be scrambled with a cell-specific sequence prior to modulation, resulting in a block of scrambled bits ($\tilde{b}$(0), . . . , $\tilde{b}$($M_{bit}$−1) according to $\tilde{b}(i)=(b(i)+c(i))\mod 2$, where the scrambling sequence c(i) is given by 3GPP TS 36.211 Section 7.2, Release 11. The scrambling sequence can be initialised with $c_{init}=N_{ID}^{cell}$ in each radio frame fulfilling $n_f \mod 4=0$.

Figure 3:
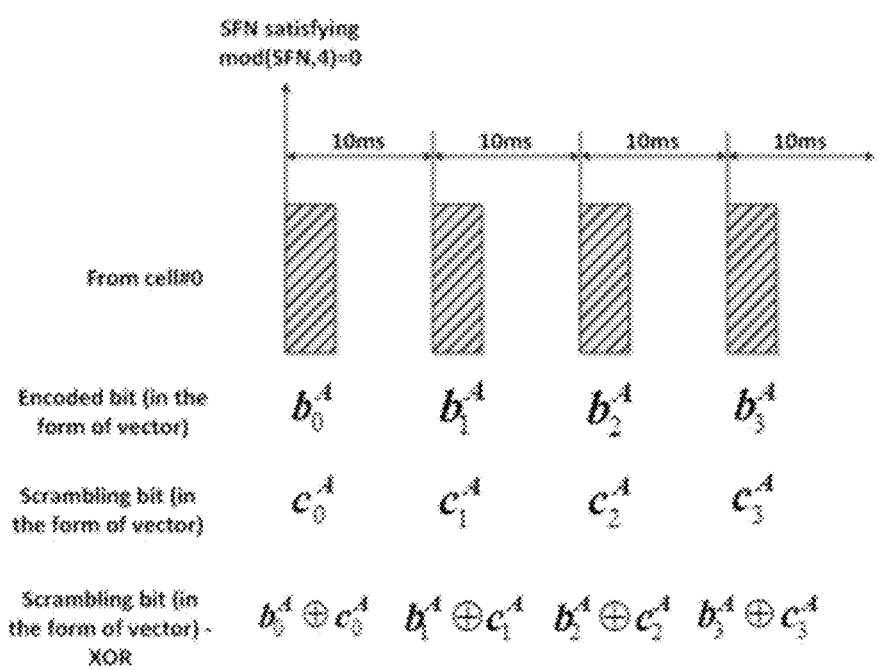
FIG. 3 illustrates a transmission of physical broadcast channel (PBCH) content from a cell to a user equipment (UE) in accordance with an example.

FIG. 3 illustrates an example of transmissions of physical broadcast channel (PBCH) content from a cell to a user equipment (UE). For example, cell #0 may transmit the PBCH content to the UE. In addition, a system frame number (SFN) for cell #0 can satisfy mod(SFN,4)=0. Cell #0 may transmit the PBCH content in a radio frame of 10 milliseconds (ms). In one example, $b_0^A$, $b_1^A$, $b_2^A$ and $b_3^A$ are encoded bits. In addition, $c_0^A$, $c_1^A$, $c_2^A$ and $c_3^A$ are scrambling bits. The "A" in the encoded bits and the scrambling bits can represent a cell ID. Each scrambling bit can be applied to a respective encoded bit in order to produce a scrambled bit, e.g., $c_0^A$ can be applied to $b_0^A$. In other words, the scrambled bit can be calculated by applying an XOR function between the encoded bit and the scrambling bit. Therefore, the scrambled bits can be calculated by performing $b_0^A \oplus c_0^A$, $b_1^A \oplus c_1^A$, $b_2^A \oplus c_2^A$ and $b_3^A \oplus c_3^A$, respectively. The scrambled bits can be transmitted from cell #0 to the UE. In the example shown in FIG. 3, each scrambled bit is transmitted in a separate radio frame from cell #0 to the UE. Upon the UE receiving the scrambled bits from cell #0, the UE can apply a descrambling technique to the scrambled bits in order to identify the encoded bits.

Figures 4, 5:
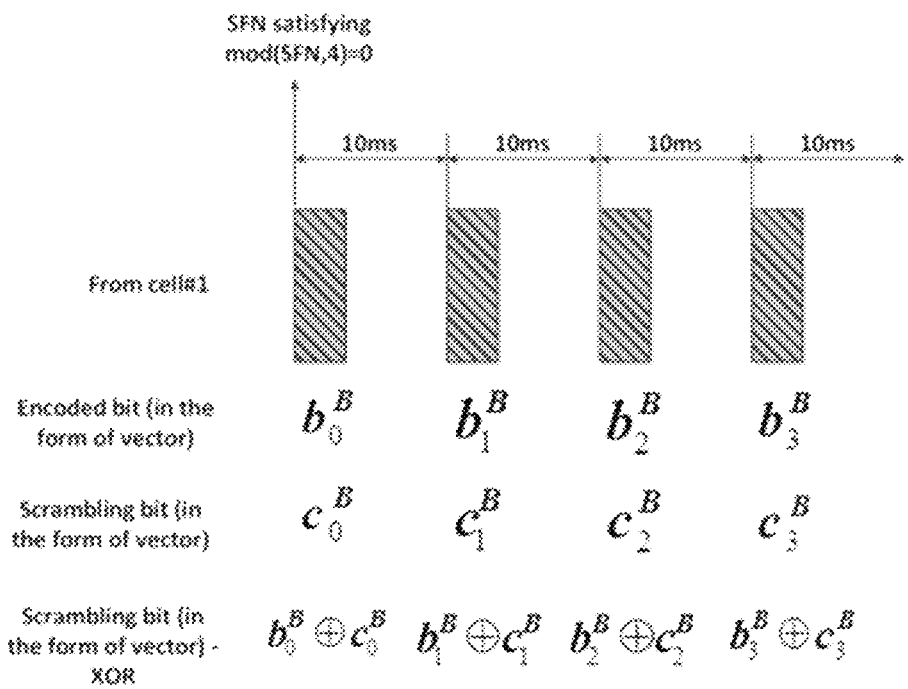
FIG. 4 illustrates an additional transmission of physical broadcast channel (PBCH) content from a cell to a user equipment (UE) in accordance with an example.
FIG. 5 illustrates collision patterns between a first cell and a second cell in accordance with an example.

FIG. 4 illustrates another example of transmissions of physical broadcast channel (PBCH) content from a cell to a user equipment (UE). For example, cell #1 may transmit the PBCH content to the UE. In addition, a system frame number (SFN) for cell #1 can satisfy mod(SFN,4)=0. Cell #1 may transmit the PBCH content in a radio frame of 10 milliseconds (ms). In one example, $b_0^B$, $b_1^B$, $b_2^B$ and $b_3^B$ are encoded bits. In addition, $c_0^B$, $c_1^B$, $c_2^B$ and $c_3^B$ are scrambling bits. The "B" in the encoded bits and the scrambling bits can represent a cell ID. Each scrambling bit can be applied to a respective encoded bit in order to produce a scrambled bit, e.g., $c_0^B$ can be applied to $b_0^B$. In other words, the scrambled bit can be calculated by applying an XOR function between the encoded bit and the scrambling bit. Therefore, the scrambled bits can be calculated by performing $b_0^B \oplus c_0^B$, $b_1^B \oplus c_1^B$, $b_2^B \oplus c_2^B$ and $b_3^B \oplus c_3^B$, respectively. The scrambled bits can be transmitted from cell #1 to the UE. In the example shown in FIG. 4, each scrambled bit is transmitted in a separate radio frame from cell #1 to the UE. Upon the UE receiving the scrambled bits from cell #1, the UE can apply a descrambling technique to the scrambled bits in order to identify the encoded bits.

FIG. 5 illustrates an example of collision patterns between a first cell and a second cell. The first cell can be cell #0 and the second cell can be cell #1. In a given subframe, cell #0 may be transmitting a first scrambled bit of $b_0^A \oplus c_0^A$ to a user equipment (UE), while cell #1 is simultaneously transmitting a second scrambled bit of $b_0^B \oplus c_0^B$ to the UE. In other words, the UE can receive the first scrambled bit from cell #0 at substantially the same time (i.e., within the same radio frame) as receiving the second scrambled bit from cell #1. As a result, the first scrambled bit can collide with the second scrambled bit at the UE. A collision pattern can result from the collision between the first scrambled bit and the second scrambled bit. The collision pattern in the first subframe at the UE can be represented as "A."

In following subframes, the collision patterns at the UE can be represented by "B," "C," and "D." In the subsequent subframes, the UE may again receive two scrambled bits from cell #0 and cell #1, respectively, that collide with one another. For example, collision pattern "B" can result from the UE receiving $b_1^A \oplus c_1^A$ and $b_1^B \oplus c_1^B$ at substantially the same time. Collision pattern "C" can result from the UE receiving $b_2^A \oplus c_2^A$ and $b_2^B \oplus c_2^B$ at substantially the same time. Collision pattern "D" can result from the UE receiving $b_3^A \oplus c_3^A$ and $b_3^B \oplus c_3^B$ at substantially the same time. However, the collision patterns may be distinct between radio frames. For example, collision pattern A is different than collision pattern B due to the different scrambling bits that are applied to the encoded bits. Since the scrambling bits are different for each transmission, the resulting scrambled bits are different at each transmission as well. The different scrambled bits can result in distinct collision patterns at each radio frame between cell #0 and cell #1 at the UE. When collision patterns are distinct at each radio frame between two or more cells, favorable inter-cell interference randomization can be achieved.

In some examples, UEs that are equipped for MTC generally operate with a single Rx antenna, whereas UEs that are equipped for LTE generally operate with two Rx antennas. As a result, the performance of the UEs equipped for MTC may be degraded by 4 dB as compared with UEs that are equipped for LTE. In addition, enhanced coverage of 10.7 dB is desired for UEs that are equipped for MTC, as further discussed in 3GPP Technical Review (TR) 36.888 Version 12.0.0.

Figure 6:
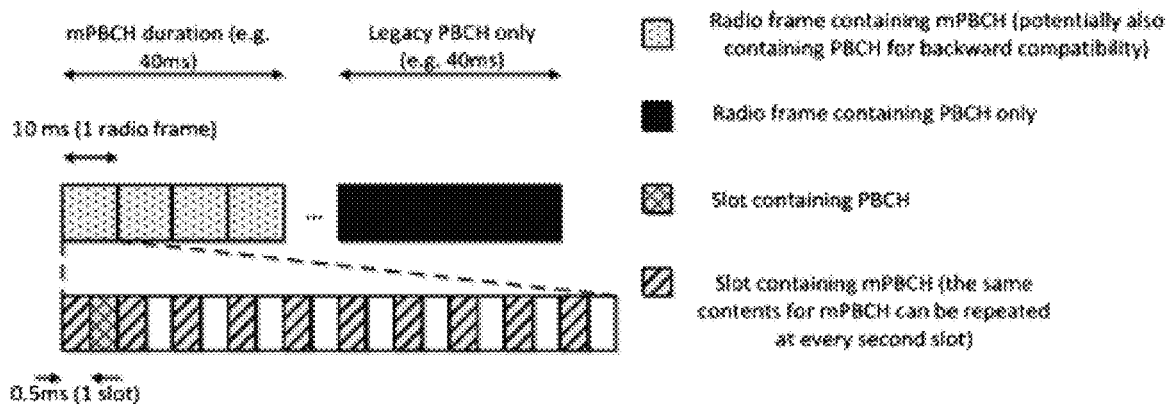
FIG. 6 illustrates a plurality of repetitions of physical broadcast channel (PBCH) content that are transmitted to a user equipment (UE) from a cell at a selected time interval in accordance with an example.

FIG. 6 illustrates an example of a plurality of repetitions of physical broadcast channel (PBCH) content that are transmitted to a user equipment (UE) at a selected time interval. The repetitions of PBCH content can be transmitted to the UE using frequency division duplexing (FDD). In one example, the PBCH content can be modified PBCH (mPBCH) contents. The mPBCH content can be transmitted to the UE during a duration of 40 ms. In particular, four radio frames can be transmitted in the 40 ms duration since each radio frame is 10 ms. Each radio frame can contain mPBCH content, as well as PBCH content for backward compatibility. Each radio frame can include ten subframes because each subframe is 1 ms. Each subframe can include a first slot and a second slot, i.e., each slot is 0.5 ms in duration. Therefore, one radio frame can include a total of twenty slots. As shown in FIG. 6, repetitions of mPBCH content can be transmitted to the UE in every other slot. Thus, one radio frame can include ten repetitions of mPBCH content that correspond to every other slot in the radio frame. In other words, the same mPBCH content can be repeated at every second slot in the radio frame.

In addition, PBCH contents can be transmitted to the UE in slots that do not contain the mPBCH contents. For example, mPBCH content can be transmitted in a first slot of a subframe and PBCH content can be transmitted in a second slot of the same subframe. The PBCH content may or may not be the same as the mPBCH content in the subframe. The rate-matching operation to fit the mPBCH content into a radio frame or four radio frames can be regarded as one kind of repetition.

If two cells (e.g., cell #0 and cell #1) are transmitting in a synchronous network, the UE may experience mPBCH collisions between the two cells. For example, the UE may be receive ten repetitions of mPBCH content from cell #0 and ten repetitions of mPBCH content from cell #1 in substantially the same slots of the radio frame. As a result, the ten repetitions of mPBCH content from cell #0 may collide with the ten repetitions of mPBCH content from cell #1 at the UE. Without applying a scrambling technique to provide interference randomization, the ten repetitions of mPBCH content on each second slot of the radio frame can have the same collision patterns between the two cells. For example, cell #0 may transmit the mPBCH content at every other slot in the radio frame as [A A A A A A A A A A] and cell #1 may transmit the mPBCH content at every other slot in the radio frame as [B B B B B B B B B B]. The collision pattern (i.e., the cross-correlation) is then determined by A and B. Therefore, the collision patterns are [C C C C C C C C C C], which does not provide interference randomization. In other words, the collision pattern is substantially the same at every other slot in the UE (i.e., not randomized). If the repetitions of mPBCH content in the radio frame are transmitted after cell-specific scrambling operations, there is substantially no interference randomization as well.

Technology is described herein for performing interference randomization by applying a novel scrambling technique to repetitions of PBCH content. The PBCH content can include mPBCH content. The novel scrambling technique can be applied to the encoded bits or to existing scrambled bits. The novel scrambling technique may involve applying an enhanced scrambling code, wherein the enhanced scrambling code is generated based on a physical cell ID and/or time-related parameters (e.g., slot number, subframe number, radio frame number). The enhanced scrambling code can be applied to the mPBCH content (e.g., at an information bit level, encoded bit level, modulation type level) in order to achieve the interference randomization. As a result, collision patterns among the cells can be substantially different for each repetition of mPBCH content at the UE.

Figure 7:
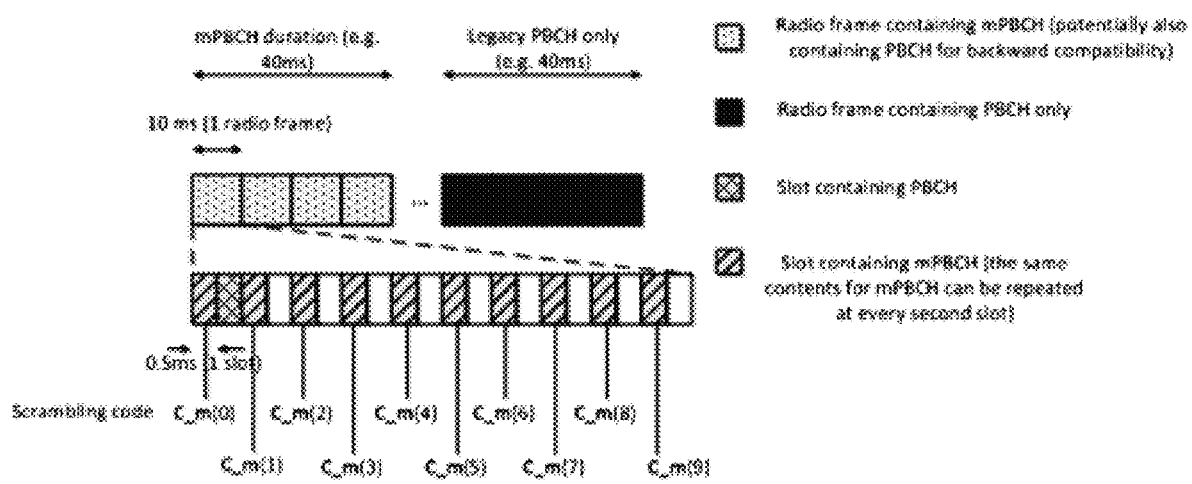
FIG. 7 illustrates a plurality of scrambling codes that are applied to repetitions of physical broadcast channel (PBCH) content in order to perform interference randomization in accordance with an example.

FIG. 7 illustrates a plurality of enhanced scrambling codes that are applied to repetitions of physical broadcast channel (PBCH) content in order to perform interference randomization. The repetitions of PBCH content are transmitted to a user equipment (UE) at selected time intervals. The repetitions of PBCH content can be transmitted to the UE using frequency division duplexing (FDD). In one example, the PBCH content can be modified PBCH (mPBCH) contents. The mPBCH content can be transmitted to the UE during a duration of 40 ms. In particular, four radio frames can be transmitted in the 40 ms duration since each radio frame is 10 ms. Each radio frame can contain mPBCH content, as well as PBCH content for backward compatibility. Each radio frame can include ten subframes because each subframe is 1 ms. Each subframe can include a first slot and a second slot, i.e., each slot is 0.5 ms in duration. Therefore, one radio frame can include a total of twenty slots. As shown in FIG. 7, repetitions of mPBCH content can be transmitted to the UE in every other slot. Thus, one radio frame can include ten repetitions of mPBCH content that correspond to every other slot in the radio frame.

The enhanced scrambling code can be applied to one or more repetitions of mPBCH content. For example, an enhanced scrambling code of C_m(0) can be applied to a first repetition, an enhanced scrambling code of C_m(1) can be applied to a second repetition, an enhanced scrambling code of C_m(2) can be applied to a third repetition, and so on. Therefore, ten distinct scrambling codes can be applied to ten repetitions of mPBCH content in a radio frame. In an alternative configuration, the enhanced scrambling code can be applied to every Nth repetition, wherein N is an integer. For example, an enhanced scrambling code of C_m(0) can be applied to a first repetition and an enhanced scrambling code of C_m(1) can be applied to a fifth repetition. In yet another configuration, the same enhanced scrambling code can be applied to multiple, but non-consecutive repetitions. For example, an enhanced scrambling code of C_m(0) can be applied to a first repetition and the enhanced scrambling code of C_m(0) can be applied to a fourth repetition.

An evolved node B (eNB) can select the enhanced scrambling codes for the repetitions of mPBCH content that are transmitted from a cell (e.g., cell #0) to the UE. The enhanced scrambling codes may randomize interferences between the repetitions of mPBCH content transmitted from the cell (e.g., cell #0) and repetitions of mPBCH content transmitted from other cells (e.g., cell #1), wherein the repetitions of mPBCH content from both cell #0 and cell #1 are transmitted to the UE in substantially the same slots of the radio frame.

In one configuration, the eNB can apply the enhanced scrambling code on top of an existing cell-specific scrambling code. In other words, the enhanced scrambling code is applied in addition to the existing scrambling code. The existing scrambling code can provide a function of 2-bit least significant bit (LSB) detection of the system frame number (SFN). The enhanced scrambling code that is applied on top of the existing scrambling code can provide interference randomization for the repetitions of mPBCH content. A scrambling sequence for initialization of the enhanced scrambling code can be based on a function of the physical cell ID, slot number, subframe number, SFN and/or the index related to the repetition block (i.e., the slots in the radio frame). In other words, the physical cell ID, slot number, subframe number, SFN and/or the index can be used to initialize the enhanced scrambling code. In one example, the initialization of the scrambling sequence can be a function of the physical cell ID, a function of the slot number, a function of the subframe number, a function of the SFN, or a function of the index related to the repetition block. If the scrambling sequence is a function of a repetition block index (e.g., n_rep), n_sf can be replaced with n_rep in the equations below.

Since the physical cell IDs, subframe numbers, etc. can vary for different cells, the enhanced scrambling codes that are generated for each cell can also vary. For example, cell #0 can transmit a set of bits that are scrambled according to C_m(0), wherein C_m(0) is a function of the physical cell ID for cell #0. Cell #0 can transmit the set of bits in a given subframe slot. Cell #1 can also transmit a set of bits that are scrambled according to C_n(0) in the same subframe slot, wherein C_n(0) is a function of the physical cell ID for cell #1. However, since the physical cell IDs for cell #0 and cell #1 are different, the enhanced scrambling code of C_m(0) for cell #0 is different than the enhanced scrambling code of C_n(0) for cell #1. In addition, enhanced scrambling codes of C_m(1) and C_m(2), as well as C_n(1) and C_n(2), can be used for sets of bits that are transmitted thereafter. Therefore, if cell #0 transmits [A A A] in given subframe slots and cell #1 transmits [B B B] in substantially the same subframe slots, the different enhanced scrambling codes (i.e., due to the different subframe numbers) would result in collision patterns of [C D E], rather than [C C C]. As a result, the interference between transmissions of mPBCH content can be randomized between cell #0 and cell #1 at the UE.

A transmission of mPBCH content in subframe $n_{sf}$ can be represented as $\tilde{b}_m(i) = (\tilde{b}(i) + c^m(i)) \mod 2$, wherein $\tilde{b}_m(i)$ is a scrambled bit and the scrambling sequence is initialized with $c_{init}^m = f(n_{sf})$ (e.g. $c_{init}^m = n_{sf}$, $c_{init}^m = 2^9 \cdot n_{sf} + N_{ID}^{cell}$, etc.) in each subframe transmitting the mPBCH content. Therefore, the subframe number is used to initialize the enhanced scrambling code (i.e., the initialization of the scrambling sequence is a function of the subframe number). In one example, the scrambled bit $b_m(i)$ can be modulated by quadrature phase-shift keying (QPSK).

For a transmission of mPBCH content or PBCH content in subframe $n_{sf}$, the block of bits $b(0), \ldots, b(M_{bit}-1)$, where $M_{bit}$, the number of bits transmitted on the physical broadcast channel, equals 1920 for normal cyclic prefix and 1728 for extended cyclic prefix, can be scrambled with a cell-specific sequence prior to modulation, resulting in a block of scrambled bits $\tilde{b}(0), \ldots, \tilde{b}(M_{bit}-1)$ according to $\tilde{b}(i) = (b(i) + c(i)) \mod 2$, where the scrambling sequence $c(i)$ is given by 3GPP TS 36.211 Section 7.2, Release 11. The scrambling sequence can be initialised with $c_{init} = 2^9 \cdot n_{sf} + N_{ID}^{cell}$ in each radio frame fulfilling $n_f \mod 4 = 0$. Thus, the above equation can be a common expression for both PBCH and mPBCH while backward compatibility can be kept for PBCH. Since the legacy PBCH is transmitted at subframe 0 (i.e., n_sf=0), the initialization value can retain the backward compatibility.

In one example, the scrambling sequence can be applied upon identifying the subframe index. The scrambling sequence can be initialized at each subframe in order to transmit the PBCH content or mPBCH content. In another example, a plurality of scrambling sequences can be generated for the repetitions of PBCH content or mPBCH content. The plurality of scrambling sequences can then be applied to the repetitions of mPBCH content (i.e., the repeated mPBCH encoded bits).

In an alternative configuration, the eNB can apply the enhanced scrambling code to mPBCH content without the existing scrambling code. In other words, the existing scrambling code can be replaced with the enhanced scrambling code. Without the existing cell-specific scrambling code, the enhanced scrambling code can provide the function of 2-bit least significant bit (LSB) system frame number (SFN) boundary, as well as interference randomization. Therefore, an initialization value for the enhanced scrambling code can be a function of a physical cell ID and time-related parameters (e.g., repeated mPBCH content position-related parameters). In addition, the initialization can be performed in each radio frame fulfilling $n_f \mod 4 = 0$.

When the eNB applies the enhanced scrambling code in place of the existing scrambling code, a transmission of mPBCH content can be represented as $\tilde{b}_m(i)=(b(i)+c^m(i))$ mod 2 when the encoded bits for all repetitions of mPBCH content are generated to fit into four radio frames. The scrambling sequence is initialized with $c_{init}^m = f(N_{ID}^{cell})$ (e.g., $c_{init}^m = N_{ID}^{cell}$) in each radio frame fulfilling $n_f$ mod 4=0. The scrambled bit $\tilde{b}_m(i)$ can be modulated by QPSK. In one example, the entire bit sequences for all repetitions can be generated to fit into four radio frames. The enhanced scrambling code is applied in order to have different scrambling patterns for all repetitions of mPBCH content within the four radio frames.

Figure 8:
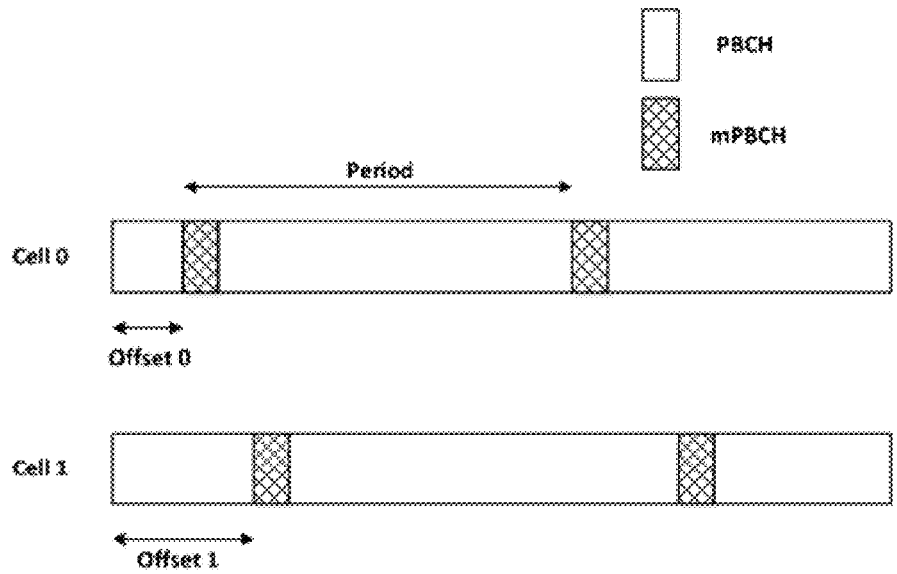
FIG. 8 illustrates a technique for avoiding collisions between physical broadcast channel (PBCH) contents that are transmitted from multiple cells to a user equipment (UE)

FIG. 8 illustrates a technique for substantially avoiding collisions between physical broadcast channel (PBCH) contents that are transmitted from multiple cells to a user equipment (UE). The UE can be equipped for MTC and can receive repetitions of PBCH content, including modified PBCH (mPBCH) content, at different locations from multiple cells. An evolved node B (eNB) can apply an offset value for the mPBCH transmission from a cell to the UE, wherein the offset value is determined based on a physical cell ID. Since the physical cell IDs are generally different for each cell, the offset values can be different for each cell as well. Therefore, the cells can transmit the mPBCH content at different time intervals. By avoiding simultaneous transmissions of mPBCH content from the multiple cells, constant collision patterns can be reduced or avoided.

As shown in FIG. 8, cell #0 can select an offset value (e.g., offset 0). Cell #0 can select the offset value according to a physical cell ID associated with cell #0. Cell #0 can transmit mPBCH content to the UE after an offset period has completed. Cell #0 can transmit additional mPBCH content to the UE after a defined period. In addition, cell #1 can select an offset value (e.g., offset 1). Cell #1 can select the offset value according to a physical cell ID associated with cell #1. Cell #1 can transmit mPBCH content to the UE after an offset period has completed. Cell #1 can transmit additional mPBCH content to the UE after a defined period. Since the physical cell IDs associated with cell #0 and cell #1 are different, the offset period selected by cell #0 is different than the offset period selected by cell #1. In other words, cell #0 may not transmit mPBCH content at substantially the same time as when cell #1 transmits mPBCH content. Therefore, the UE may receive the mPBCH content from cell #0 and the mPBCH content from cell #1 at substantially different times, thereby substantially avoiding collisions between cell #0 and cell #1.

In one configuration, interleaving (e.g., cell-specific interleaving) may be performed in order to achieve interference randomization. The interleaving may be performed at a subframe level. The interleaving can be performed with a predetermined pattern on encoded bits, information bits and/or modulation symbols. The predetermined pattern for interleaving can be determined using a pseudo random sequence. The pseudo random sequence can be initialized by one or more parameters, wherein the parameters are related to the physical cell ID and/or subframe number.

As an example, the encoded bits in a subframe are repeated in all of the other subframes within a radio frame. Therefore, all of the encoded bits in all of the subframes can be identical, e.g., [c_0 c_1 c_2 c_3 , , , c_M−1], where M is the number of encoded bits in a subframe for the mPBCH content. With a suitable initialization value for the pseudo random sequence, the cell-specific interleaving can be performed at every subframe. In one example, the initialization value may be determined by $f(N_{ID}^{cell}, n_{sf})$. After interleaving is performed on the encoded bits, at subframe # n and in a radio frame # m, the encoded bits for cell #0 and cell #1 can be provided with interference randomization. For example, cell #0 can transmit [c_10 c_0 c_91 . . . c3] with a length M to the UE, and cell #1 can transmit [c_3 c_32 c_71 . . . c28] with a length M to the UE. Cell #0 and cell #1 can transmit different mPBCH content at each subframe because the physical cell IDs and the subframe numbers are different for cell #0 and cell #1. Therefore, the collision patterns at particular subframes at the UE (e.g., the collision between c_10 and c_3, the collision between c_0 and c_32, the collision between c_91 and c_71, the collision between c_3 and c_28) can be randomized, thereby improving the performance at the UE.

Figure 9:
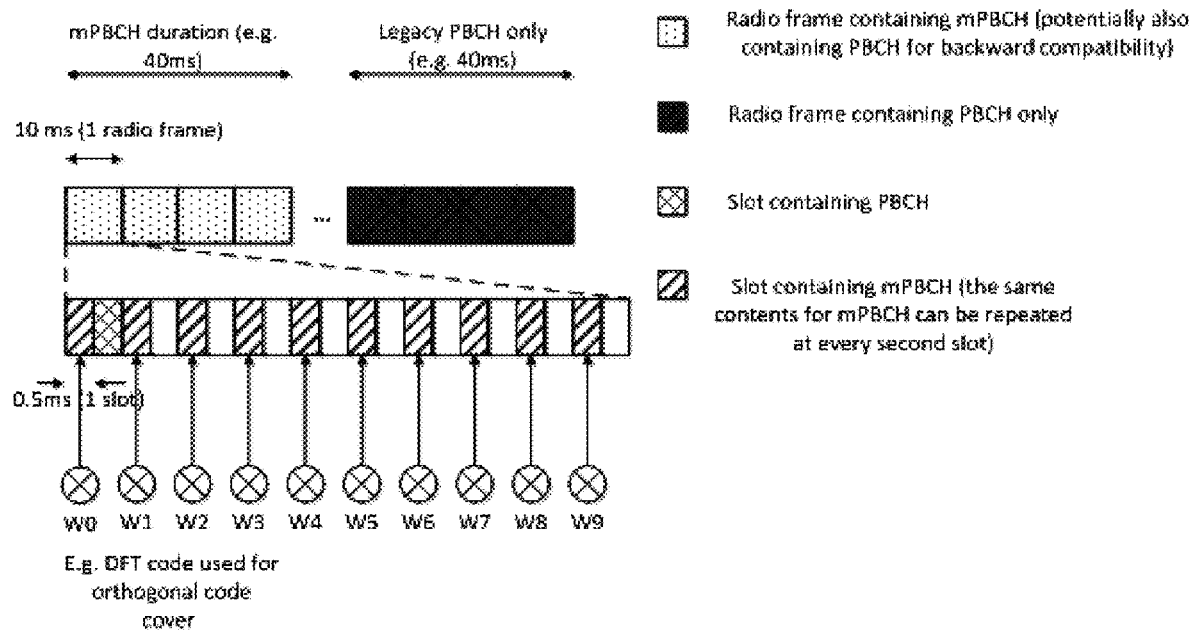
FIG. 9 illustrates a plurality of orthogonal code cover that are applied to repetitions of physical broadcast channel (PBCH) content in accordance with an example.

FIG. 9 illustrates a technique for substantially canceling interference between transmissions of physical broadcast channel (PBCH) content. The interference can be substantially canceled as an alternative to interference randomization in order to improve performance at the user equipment (UE). Repetitions of PBCH content can be transmitted to the UE using frequency division duplexing (FDD). In one example, the PBCH content can be modified PBCH (mPBCH) contents. The mPBCH content can be transmitted to the UE using one or more radio frames. Each radio frame can include ten subframes, wherein each subframe includes a first slot and a second slot. As shown in FIG. 9, repetitions of mPBCH content can be transmitted to the UE in every other slot. In other words, the same mPBCH contents (e.g., encoded bits) can be repeated at the subframes used for mPBCH transmissions to the UE.

Orthogonal code covers can be applied to the repetitions of PBCH content. The orthogonal code covers can result in interferences other than the intended mPBCH content from a cell being canceled out. The orthogonal code covers can be in relation to physical cell IDs. As shown in FIG. 9, the same repetition blocks are transmitted within a radio frame for each cell. The orthogonal code covers can be applied on top of the repetition blocks. A first orthogonal code cover (e.g., W0) can be applied to a first repetition, a second orthogonal code cover (e.g., W1) can be applied to a second repetition, a third orthogonal code cover (e.g., W2) can be applied to a third repetition, and so on. The orthogonal code cover can include a Discrete Fourier Transform (DFT) code (e.g., equivalent time or frequency domain cyclic shift) or a Walsh code.

In one example, the DFT code used for the orthogonal code cover can be according to $$w_n^u = e^{j\frac{2\pi u n}{N}},$$

wherein u is a code index (0, 1, . . . N−1) that corresponds to the cell ID, n is a running index (0, 1, . . . N−1) that corresponds to the subframe index or repetition block index, and N is a sequence length for orthogonal code. Cell #0 may use u=0 and cell #1 may use u=1. When a UE attempts to decode mPBCH content that is received from cell #0, an interfered term from cell #1 can be cancelled out by a de-spreading operation with u=0 due to the orthogonal property of the DFT code. In other words, the UE can receive mPBCH content from cell #0 and mPBCH content from cell #1 on the same subframes. However, rather than causing interference at the subframes, the orthogonal properties of the DFT codes can substantially cancel interference between the mPBCH content received from cell #0 and the mPBCH content received from cell #1 at the UE.

Figure 10:
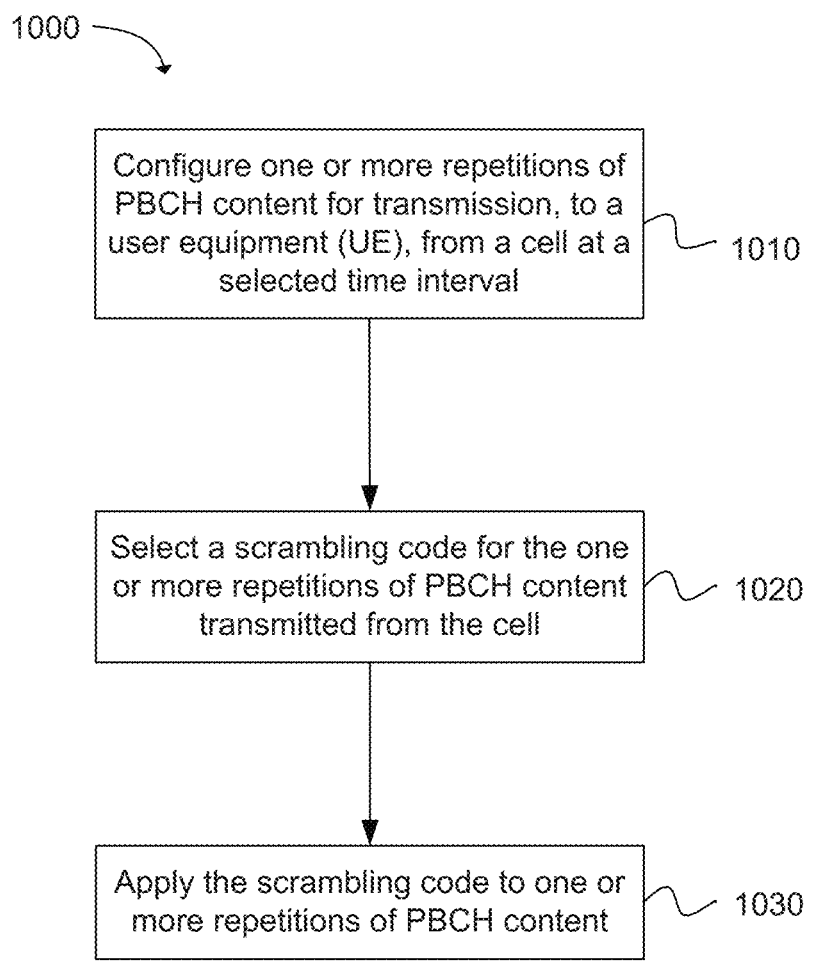
FIG. 10 depicts functionality of computer circuitry of an evolved node B (eNB) operable to transmit physical broadcast channel (PBCH) contents in accordance with an example.

Another example provides functionality 1000 of computer circuitry of an evolved node B (eNB) operable to transmit physical broadcast channel (PBCH) contents, as shown in the flow chart in FIG. 10. The functionality may be implemented as a method or the functionality may be executed as instructions on a machine, where the instructions are included on at least one computer readable medium or one non-transitory machine readable storage medium. The computer circuitry can be configured to configure one or more repetitions of PBCH content for transmission, to a user equipment (UE), from a cell at a selected time interval, as in block 1010. The computer circuitry can be configured to select a scrambling code for the one or more repetitions of PBCH content transmitted from the cell, as in block 1020. The computer circuitry can be further configured to apply the scrambling code to one or more repetitions of PBCH content, as in block 1030.

In one example, the computer circuitry can be further configured to select the scrambling code based on a function of at least one of: a physical cell ID, a slot number, a subframe number, a system frame number (SFN), or an index related to the one or more repetitions of PBCH content. In one configuration, the PBCH content includes modified physical broadcast channel (mPBCH) content. In addition, the scrambling code is selected to provide interference randomization for PBCH collision patterns at the UE In one example, the computer circuitry can be further configured to select a separate scrambling code for each of the repetitions of PBCH content. In one configuration, each repetition of PBCH content is transmitted to the UE in a slot of a subframe. In addition, the computer circuitry can be further configured to apply the scrambling codes on the one or more repetitions of PBCH content on top of an existing scrambling code.

In one example, the computer circuitry can be further configured to scramble bits included in the one or more repetitions of PBCH content according to $\tilde{b}_m(i)=(b(i)+c^m(i))$ mod 2, wherein $c^m(i)$ is a scrambling sequence and is initialized with $c_{init}^m=f(N_{ID}^{cell})$ in each subframe $n_{sf}$ transmitting the one or more repetitions of PBCH content to the UE. In addition, the computer circuitry can be further configured to scramble bits included in the one or more repetitions of PBCH content transmitted in subframe $n_{sf}$ according to 15(0=(b(i)+c(i))mod 2, wherein c(i) is a scrambling sequence and is initialized with $c_{init}=2^9 \cdot n_{sf}+N_{ID}^{cell}$ in each radio frame fulfilling $n_f$ mod 4=0. Furthermore, the computer circuitry can be further configured to scramble bits included in the one or more repetitions of PBCH content according to $\tilde{b}_m(i)=(b(i)+c^m(i))$mod 2, wherein $c^m(i)$ is a scrambling sequence and is initialized with $c_{init}^m=f(N_{ID}^{cell})$ in each radio frame fulfilling $n_f$ mod 4=0.

In one example, the computer circuitry can be further configured to apply the scrambling code on information bits, encoded bits or modulation symbols included in the one or more repetitions of PBCH content. In one configuration, the UE is operable to perform machine type communication (MTC). In addition, the computer circuitry can be further configured to apply an interleaving pattern to the one or more repetitions of PBCH content in order to achieve interference randomization.

In one example, the computer circuitry can be further configured to apply the interleaving pattern with at least one of: encoded bits, information bits or modulation symbols. In addition, the computer circuitry can be further configured to select the interleaving pattern using a pseudo random sequence that is initialized based on a physical cell ID or a subframe number.

Figure 11:
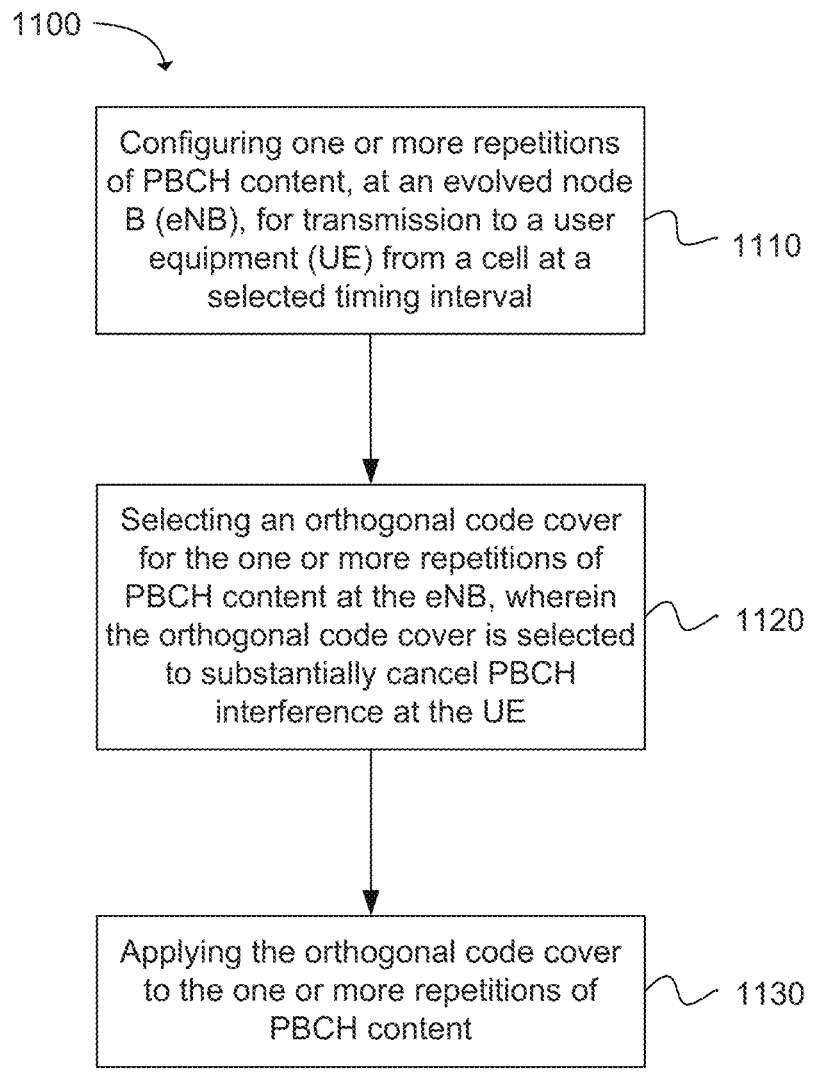
FIG. 11 depicts a flowchart of a method for transmitting physical broadcast channel (PBCH) contents in accordance with an example.

Another example provides a method 1100 for transmitting physical broadcast channel (PBCH) contents, as shown in the flow chart in FIG. 11. The method may be executed as instructions on a machine, where the instructions are included on at least one computer readable medium or one non-transitory machine readable storage medium. The method includes the operation of configuring one or more repetitions of PBCH content, at an evolved node B (eNB), for transmission to a user equipment (UE) from a cell at a selected timing interval, as in block 1110. The method includes the operation of selecting an orthogonal code cover for the one or more repetitions of PBCH content at the eNB, wherein the orthogonal code cover is selected to substantially cancel PBCH interference at the UE, as in block 1120. In addition, the method includes the operation of applying the orthogonal code cover to the one or more repetitions of PBCH content, as in block 1130.

In one example, the method includes the operation of selecting the orthogonal code cover using a physical cell identifier (ID). In one configuration, the orthogonal code cover includes a Discrete Fourier Transform (DFT) code or a Walsh code. In addition, the DFT codes are selected according to $$w_n^u = e^{j\frac{2\pi un}{N}},$$

wherein u is a code index (0, 1, . . . N−1) that corresponds to the cell ID, n is a running index (0, 1, . . . N−1) that corresponds to the subframe index or repetition block index, and N is a sequence length for orthogonal code. In one example, the UE includes an antenna, a touch sensitive display screen, a speaker, a microphone, a graphics processor, an application processor, internal memory, or a non-volatile memory port.

Figure 12:
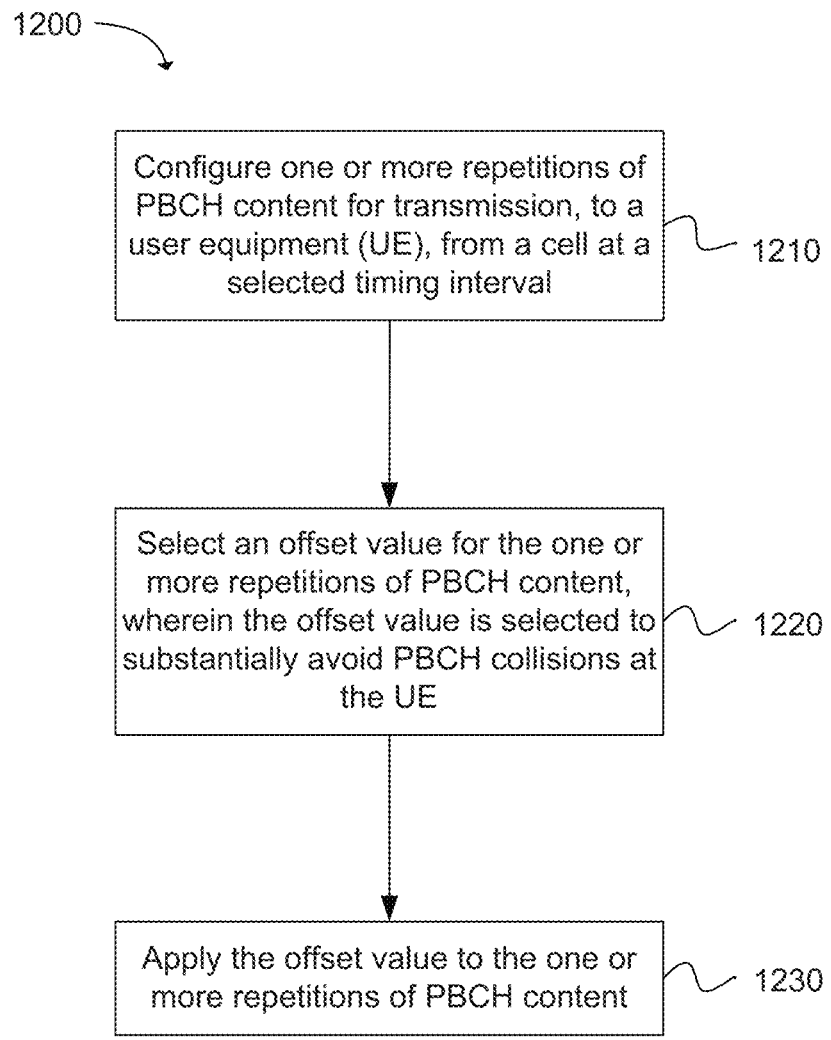
FIG. 12 depicts functionality of computer circuitry of an evolved node B (eNB) operable to transmit physical broadcast channel (PBCH) contents in accordance with an example.

Another example provides functionality 1200 of computer circuitry of an evolved node B (eNB) operable to transmit physical broadcast channel (PBCH) contents, as shown in the flow chart in FIG. 12. The functionality may be implemented as a method or the functionality may be executed as instructions on a machine, where the instructions are included on at least one computer readable medium or one non-transitory machine readable storage medium. The computer circuitry can be configured to configure one or more repetitions of PBCH content for transmission, to a user equipment (UE), from a cell at a selected timing interval, as in block 1210. The computer circuitry can be configured to select an offset value for the one or more repetitions of PBCH content, wherein the offset value is selected to substantially avoid PBCH collisions at the UE, as in block 1220. In addition, the computer circuitry can be configured to apply the offset value to the one or more repetitions of PBCH content, as in block 1230.

In one example, the computer circuitry can be further configured to select the offset value using a physical cell identifier (ID). In one example, the UE that receives the PBCH content from the cell is configured for machine type communication (MTC). In an additional example, the PBCH content includes modified physical broadcast channel (mPBCH) content.

Figure 13:
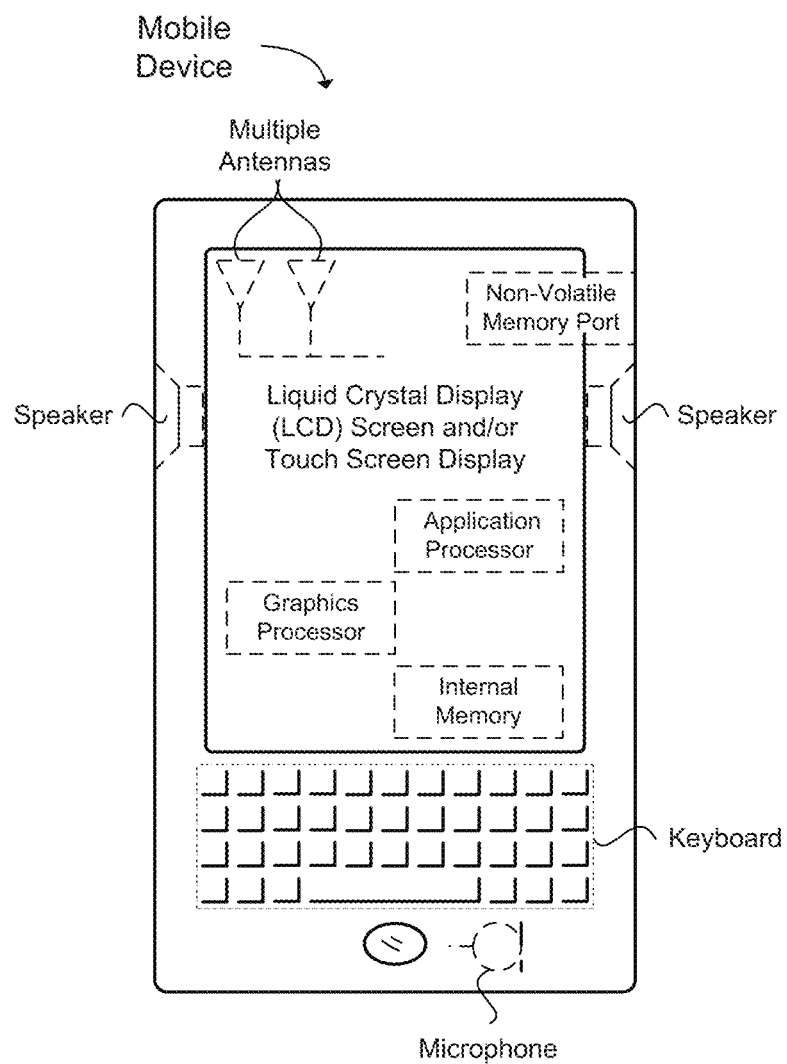
FIG. 13 illustrates a diagram of a wireless device (e.g., UE) in accordance with an example.

FIG. 13 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 13 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a base station operable to generate physical broadcast channel (PBCH) content, the apparatus comprising one or more processors and memory configured to:
    generate, at the base station, one or more repetitions of PBCH content for transmission to a user equipment (UE);
    determine, at the base station, a scrambling code for the one or more repetitions of PBCH content for transmission from the base station;
    apply, at the bsae station, the scrambling code to the one or more repetitions of PBCH content, wherein applying the scrambling code comprises scrambling bits included in the one or more repetitions of PBCH content according to $\tilde{b}_m(i)=(b(i)+c^m(i))\bmod 2$, wherein $c^m(i)$ is a scrambling sequence, and wherein $\tilde{b}_m(i)$ represents a clock of scrambled bits and b(i) represents a block of bits.

2. The apparatus of claim 1, further comprising a transceiver configured to transmit the one or more repetitions of PBCH content to the UE.

3. The apparatus of claim 1, wherein the one or more processors and memory are further configured to select the scrambling code based on a physical cell identifier (ID).

4. The apparatus of claim 1, wherein the PBCH content includes modified physical broadcast channel (mPBCH) content.

5. The apparatus of claim 1, wherein each repetition of PBCH content is transmitted in a respective slot of a subframe.

6. The apparatus of claim 1, wherein the scrambling sequence is initialized using $N^{cell}_{ID}$.

7. A method comprising:
    receiving, at a user equipment (UE) and from a base station, a physical broadcast channel (PBCH) signal that includes one or more repetitions of PBCH content that are scrambled at the base station using a scrambling code;
    decode, at the UE, the one of more repetitions of PBCH content, wherein the one or more repetitions of PBCH content are scrambled using $\tilde{b}_m(i)=(b(i)+c^m(i))\bmod 2$, wherein $c^m(i)$ is a scrambling sequence, and wherein $\tilde{b}_m(i)$ represents a block of scrambled bits and b(i) represents a block of bits; and
    determine the PBCH content based on the decoding of the one or more repetitions of PBCH content.

8. The method of claim 7, wherein the PBCH signal is received at the UE via a transceiver of the UE.

9. The method of claim 7, wherein the PBCH content includes modified physical broadcast channel (mPBCH) content.

10. The method of claim 7, wherein each repetition of PBCH content is transmitted in a respective slot of a subframe.

11. The method of claim 7, wherein the scrambling sequence is initialized using $N^{cell}_{ID}$.

12. A method comprising:
    generating, using one or more processors at a base station, one or more repetitions of physical broadcst channel (PBCH) content for transmission to a user equipment (UE);
    generating, using the one or more processors at the base station, a scrambling code for the one or more repetitions of PBCH content; and
    applying, using the one or more processors at the base station, the scrambling code to the one or more repetitions of PBCH content, wherein applying the scrambling code to the one or more repetitions of PBCH content comprises:
        scrambling bits included in the one or more repetitions of PBCH content using $b_m(i)=(b(i)+c^m(i))\bmod 2$, wherein $c^m(i)$ is a scrambling sequence, and wherein $\tilde{b}_m(i)$ represents a block of scrambled bits and b(i) represents a block of bits.

13. The method of claim 12, wherein each repetition of PBCH content is transmitted in a respective slot of a subframe.

14. The method of claim 12, wherein the scrambling sequence is initialized using $N^{cell}_{ID}$.

15. The method of claim 12, wherein applying, using the one or more processors at the base station, the scrambling code to the one or more repetitions of PBCH content comprises:
    applying the scrambling code on the one or more repetitions of PBCH content on top of an existing scrambling code.

16. The method of claim 12, wherein applying, using the one or more processors at the base station, the scrambling code to the one or more repetitions of PBCH content comprises:
    applying the scrambling code on information bits, encoded bits, or modulation symbols included in the one or more repetitions of PBCH content.

17. The method of claim 12, wherein the scrambling code is selected based on a physical cell identifier (ID).

* * * * *

UNITED STATES PATENT AND TRADEMARK OFFICE
CERTIFICATE OF CORRECTION

PATENT NO. : 11,039,334 B2  
APPLICATION NO. : 16/153584  
DATED : June 15, 2021  
INVENTOR(S) : Seunghee Han, Gang Xiong and Alexey Khoryaev Page 1 of 1

It is certified that error appears in the above-identified patent and that said Letters Patent is hereby corrected as shown below:

In the Claims

Column 15, Line 25, in Claim 1, delete "bsae" and insert -- base --;

Column 15, Line 29, in Claim 1, delete "$\tilde{b}_m\ (i)$" and insert -- $\tilde{b}_m(i)$ --;

Column 15, Line 31, in Claim 1, delete "clock" and insert -- block --;

Column 15, Line 31, in Claim 1, delete "b(i)represents" and insert -- b(i) represents --;

Column 15, Line 53, in Claim 7, delete "of more" and insert -- or more --;

Column 15, Line 55, in Claim 7, delete "$\tilde{b}_m\ (i)$" and insert -- $\tilde{b}_m(i)$ --;

Column 16, Line 18, in Claim 12, delete "broadcst" and insert -- broadcast --; and Column 16, Line 30, in Claim 12, delete "$b_m(i)$" and insert -- $\tilde{b}_m(i)$ --.

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*